Figure 1:
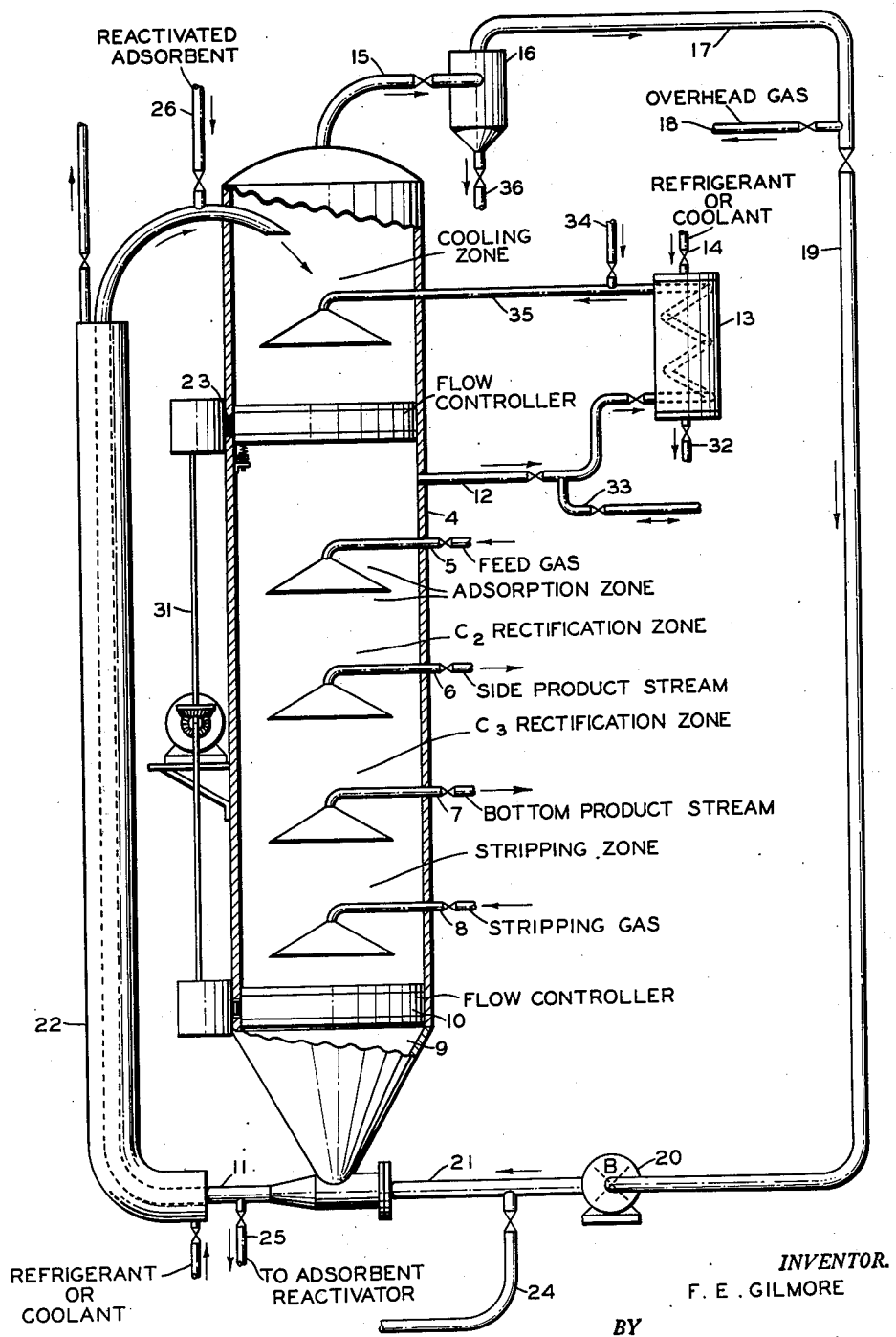

INVENTOR.
F. E. GILMORE
BY
Hudson and Young
ATTORNEYS

Patented Apr. 21, 1953

2,635,706

UNITED STATES PATENT OFFICE 2,635,706

SELECTIVE ADSORPTION SEPARATION APPARATUS

Forrest E. Gilmore, Bartlesville, Okla., assignor to Phillips Petroleum Company, a corporation of Delaware Application August 29, 1949, Serial No. 112,922

2 Claims. (Cl. 183—4.2)

This invention relates to the separation of gaseous materials. In one of its embodiments it relates to a selective adsorption separation process for the separation of low-boiling normally gaseous materials. In another of its embodiments it relates to apparatus for carrying on selective adsorption separation of low-boiling normally gaseous materials.

The prior art teaches that low-boiling normally gaseous materials can be separated by low temperature fractional distillation processes. Also, it has been taught to use fixed bed or cyclic fixed bed selective adsorption processes for the separation of low-boiling normally gaseous materials. Continuous moving-bed selective adsorption processes utilizing a moving bed of a selective adsorbent, such as activated-charcoal, silica gel, etc. have been proposed and used. However, the presently known processes have certain disadvantages. Low temperature fractional distillation methods are too expensive. Fixed-bed and cyclic fixed-bed adsorption processes do not produce products of high purity nor do they recover a large percentage of the product desired to be separated and available in the feed mixture to be treated. One continuous moving-bed selective adsorption process uses indirect heat exchange to cool activated-charcoal before it is introduced into the adsorption zone. The indirect heat exchange equipment consists of a vertically disposed bundle of cooling coils. This method of cooling activated-charcoal is a very poor method since poor heat transfer is realized and the height of adsorption equipment is necessarily increased due to the presence of the cooling coil bundle in the top of the adsorption column. The construction cost of the adsorption equipment is relatively expensive due to this activated-charcoal cooling method. In addition, attrition losses of the activated-charcoal are enhanced due to the fact that the charcoal must pass through relatively small passageways while being cooled by the indirect heat exchange means. One known continuous moving-bed activated-charcoal selective adsorption separation process utilizes gas and activated-charcoal disengaging means in order to provide for vapor withdrawal and introduction into the moving bed of activated charcoal. The disengaging means employed consists of a plurality of cylindrical down-spouts through which the charcoal passes, a vapor space being created around the down-spouts below a horizontal plate supporting the down-spouts and above the charcoal bed created by charcoal exiting from the down-spouts. This method of introducing vapors into and withdrawing vapors from a moving bed of activated-charcoal has certain disadvantages. Chief among these disadvantages is that attrition loss of activated-charcoal is enhanced due to the constriction of the cross sectional area of flow of the activated-charcoal as it passes down through the down-spouts. Since activated-charcoal, such as a good grade of cocoanut shell activated-charcoal is relatively expensive, any method or apparatus which will reduce the loss of activated-charcoal due to attrition, would be a step forward in the art. Also, methods and apparatus for efficiently and economically cooling activated-charcoal prior to its reintroduction into an adsorption zone would be very advantageous and steps forward in the art. I have invented such a method and such apparatus.

I have invented a process of separating low-boiling normally gaseous materials from a mixture of low-boiling normally gaseous materials comprising said low-boiling normally gaseous materials desired to be separated in admixture with lower boiling materials. I introduce the mixture to be treated into an adsorption zone contained in a selective adsorption separation zone. My selective adsorption separation zone contains a moving bed of a selective adsorbent, said moving bed comprising from top to bottom a selective adsorbent cooling zone, an adsorption zone, a rectification zone, and a shipping zone. In said adsorption zone I directly contact the mixture to be treated and the selective adsorbent employed, thereby adsorbing the low-boiling normally gaseous materials desired to be separated from the mixture and a portion of lower boiling materials present in the mixture. The selective adsorbent is passed from the selective adsorbent cooling zone into the adsorption zone, preferably positively passed by flow control means which prevents the flow of vapors from the adsorption zone into the selective adsorbent cooling zone. In the selective adsorbent cooling operation of the process of my invention I withdraw lower boiling materials from the adsorption zone, remove heat from same, and introduce same into the selective adsorbent cooling zone. In the selective adsorbent cooling zone the selective adsorbent is directly contacted with the cooled lower boiling materials, thus cooling the selective adsorbent prior to its passage into the adsorption zone. The resulting lower boiling materials used for cooling the selective adsorbent are withdrawn from the selective adsorbent cooling zone to be withdrawn from the system and/or used to recirculate selective adsorbent, as will hereinafter be set forth. Selective adsorbent, containing the low-boiling normally gaseous materials desired to be separated from the mixture and lower boiling materials, passes from the adsorption zone into a rectification zone wherein lower boiling materials are displaced from the selective adsorbent by low-boiling normally gaseous materials produced by stripping selective adsorbent in a stripping zone, as hereinafter set forth. Low-boiling normally gaseous materials desired to be separated from the mixture treated are removed from the moving bed of selective adsorbent in admixture with stripping gas between the rectification zone and the stripping zone. The low-boiling normally gaseous materials desired to be separated from the mixture treated are stripped from the selective adsorbent by introducing a stripping gas, preferably superheated steam and/or a portion of the product gas which has been heated, into the stripping zone wherein the stripping gas directly contacts the selective adsorbent. Resulting stripped selective adsorbent is withdrawn from the stripping zone and is passed back into the selective adsorbent cooling zone by suitable means, such as a gas-lift system, preferably using a portion of the lower boiling materials withdrawn from the selective adsorbent cooling zone. In a desirable modification of the process of my invention I use indirect heat exchange means to cool the stripping selective adsorbent during its external passage back into the selective adsorbent cooling zone.

A preferred manner of conducting the process of my invention is with a specific, and novel, selective adsorption separation apparatus. This apparatus of my invention comprises, in combination, a closed elongated vessel, preferably a cylindrical vessel, which is vertically disposed. In the upper portion of the vessel between the selective adsorbent cooling zone and the adsorption zone, I provide a flow controller which gives positive passage of selective adsorbent into the adsorption zone but which prevents vapors from passing upwardly through the flow controller between the adsorption zone and the selective adsorbent cooling zone. Also, I provide a second flow controller, preferably a positive passage flow controller similar to the above-mentioned flow controller, in the lower portion of the vessel, the last mentioned flow controller being used to withdraw stripped selective adsorbent from the stripping zone. In operation the flow controllers normally act in unison, i. e., each flow controller picking up and discharging the same amount of selective adsorbent so as to give a constant and even flow of selective adsorbent through the vessel. Conduits are provided for introducing the mixture of gases to be treated into the adsorption zone, for withdrawing product gas streams and for introducing stripping gas into the stripping zone. Also, conduits are provided for withdrawing vapors from the adsorption zone and passing same to heat exchange means, for cooling of the vapors, and for passing the cooled vapors from the heat exchange means into the selective adsorbent cooling zone. Additional conduits can be used for transferring stripped selective adsorbent from the stripping zone back into the selective adsorption cooling zone and for carrying overhead vapors used to convey stripped selective adsorbent back into the selective adsorption cooling zone. A conduit can be used for withdrawing overhead vapors, not used to pass stripped selective adsorbent, from the system.

It is an object of this invention to provide a method for separating materials.

It is another object of this invention to provide a selective adsorption separation method for separating a mixture of low-boiling normally gaseous materials.

It is still another object of this invention to provide apparatus for carrying on selective adsorption separation of a mixture of low-boiling normally gaseous materials.

Other objects and advantages of the process and apparatus of my invention will become apparent, to one skilled in the art, upon reading this discussion and disclosure.

Figure 2:
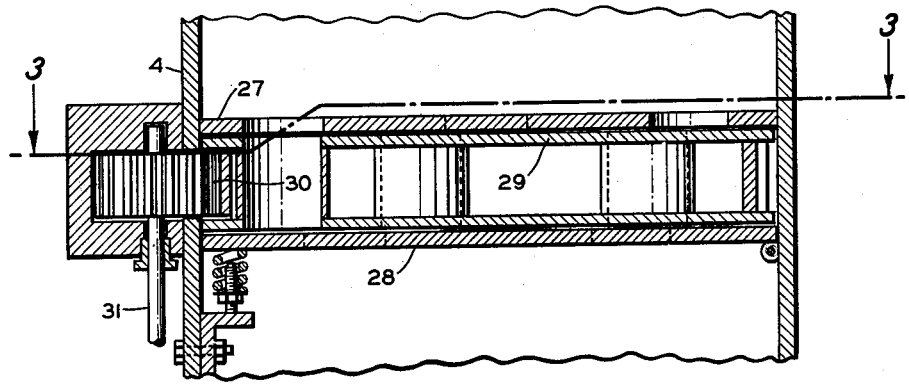
Figure 3:
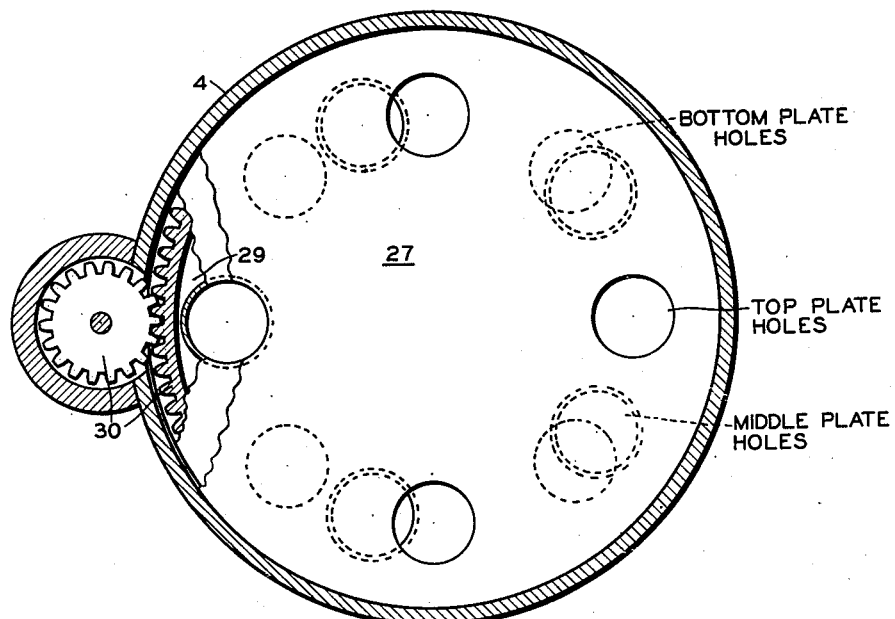

The drawings, Figures 1, 2, and 3, which accompany my disclosure are a part of my disclosure. Figure 1 diagrammatically depicts an embodiment of the process of my invention, and depicts apparatus in which the process of my invention can be carried out. Figures 2 and 3 depict a positive flow control device which can be used in the separation apparatus of my invention. The flow control device as shown in Figures 2 and 3 allows for the passage of solid material from a region above the flow controller to a region below the flow controller, but prevents passage of vapors from a region below to a region above the flow controller.

The process and apparatus of my invention can be used to separate low-boiling normally gaseous materials from a mixture of low-boiling normally gaseous materials comprising said low-boiling normally gaseous materials desired to be separated in admixture with lower boiling materials. Some of the operations to which the process and apparatus of my invention can advantageously be applied are the treating of low-boiling normally gaseous hydrocarbon materials separated from natural and/or refinery residue gases to separate and recover relatively pure $C_3$'s and $C_4$'s or to separate and recover a $C_2$ stream, a $C_3$ stream and a $C_4$ stream; nitrogen can be removed from natural gas; hydrocarbon synthesis gases can be treated to remove $CO_2$, $H_2S$ and carbonyl sulfide; methane and HCl can be separated; acetylene can be recovered from the products resulting from the partial oxidation of natural gas for the production of acetylene; ethylene can be recovered from gas streams containing same; etc.

The process and apparatus of my invention can be used to and finds ready application to the treating of a gaseous mixture comprising methane and lighter, $C_2$'s, $C_3$'s, and $C_4$'s, a gaseous mixture available as a result of treating natural gas to separate and recover gasoline and the above mentioned gaseous mixture. The process and apparatus of my invention can be used to separate such a gas, e. g. into an overhead methane and lighter stream, a $C_2$ side product stream, and a $C_3$ and $C_4$ stream or, as will be apparent to one skilled in the art, into a methane and lighter stream, a $C_2$ stream, a $C_3$ stream, and a $C_4$ stream, or, if desired, the side-cut can be eliminated and a $C_2$ and lighter stream and a $C_3$ and heavier stream can be produced. Figure 1 diagrammatically sets forth a method and apparatus for making the above first-mentioned separation, and the following discussion referring to Figure 1, is set forth to enable one skilled in the art to better understand the method of carrying on the process of my invention and how to design and operate the apparatus of my invention. However, the following discussion is not to unduly limit the scope of my invention.

The gaseous mixture to be treated is passed into adsorber 4 via line 5. Therein the gaseous mixture contacts a moving bed of a selective adsorbent, such as activated charcoal, silica gel, bauxite, fuller's earth, etc., preferably activated charcoal, and the $C_2$ and higher boiling hydrocarbons along with some methane and lighter materials are adsorbed on the selective adsorbent in a section of the bed which I refer to as the adsorption zone. I prefer to use a selective adsorbent having a particle size in the range from 5 to 60 mesh. The selective adsorbent saturated with hydrocarbons passes downwardly into what I refer to as the $C_2$ rectification zone wherein methane and lighter materials are displaced from the selective adsorbent by $C_2$'s which are produced by displacing $C_2$'s from selective adsorbent with $C_3$'s, as will hereinafter be set forth. The $C_2$ rectification zone, as I refer to it, is located at a level in the moving bed of selective adsorbent between a point where $C_2$ side product stream is withdrawn via line 6 and a point where the said gaseous mixture is introduced via line 5. This point or region in the bed where $C_2$'s are displacing methane and lighter can be located by the temperature rise in the bed caused by the desorption of methane and lighter by $C_2$'s, as indicated by thermocouples, or the like, not shown. This $C_2$ rectification region is preferably kept above the point of $C_2$ side product stream withdrawal. Selective adsorbent, desorbed of methane and lighter and saturated with $C_2$ and higher boiling hydrocarbons, passes downwardly in the moving bed and $C_2$ hydrocarbons are displaced from the selective adsorbent by $C_3$ hydrocarbons produced by stripping the selective adsorbent in the stripping zone, as will hereinafter be set forth.

I refer to the region wherein $C_2$ hydrocarbons are displaced from the selective adsorbent by $C_3$ hydrocarbons as the $C_3$ rectification zone. This $C_3$ rectification zone is located at a region in the moving bed between the point where the $C_2$ side product stream is withdrawn and a point where the $C_3$ and $C_4$ bottom product stream is withdrawn via line 7. Here again, the region where $C_3$'s are displaced by $C_2$'s can be located by the temperature rise of the selective adsorbent due to the displacement of $C_2$'s by $C_3$'s. A portion of the $C_2$'s displaced by the $C_3$'s are withdrawn as a $C_2$ side product stream via line 6 and the remaining $C_2$'s pass upwardly to displace methane and lighter from the selective adsorbent in the $C_2$ rectification zone. As will be apparent to one skilled in the art, the method and apparatus of my invention can be used, by eliminating side-cuts, to make only an overhead gas and a bottoms product gas, or several side-cuts can be made, if desired. Selective adsorbent saturated with $C_3$'s and $C_4$'s passes downwardly through the adsorber into a stripping zone, a region of the moving bed below the point where a $C_3$ and $C_4$ bottom product stream is withdrawn via line 7.

Stripping gas is introduced into the stripping zone, preferably into the lower portion of said stripping zone, via line 8, and is used to strip $C_3$'s and $C_4$'s from the selective adsorbent. I prefer to use superheated steam and/or a portion of the $C_3$ and $C_4$ bottom product stream which has been heated as stripping gas. If superheated steam is used as stripping gas, it is withdrawn via line 7 in admixture with the $C_3$ and $C_4$ bottom product stream. The superheated steam and the $C_3$'s and $C_4$'s may conveniently be separated by condensing the steam and separating resulting water from the $C_3$'s and $C_4$'s. Selective adsorbent which has been stripped or desorbed is withdrawn from the stripping zone and passed into a collecting chamber 9 below flow controller 10.

I prefer that flow controller 10 be a positive flow controller, such as the controller depicted in Figures 2 and 3, which operates to pass the selective adsorbent but which prevents passage of vapors. The stripped selective adsorbent is withdrawn from collecting chamber 9 and is passed via conduit 11 back into a selective adsorbent cooling zone in the upper portion of adsorber 4. A methane and lighter fraction is withdrawn from adsorber 4 via line 12 and is passed into heat exchanger 13 wherein the methane and lighter is cooled. Methane and lighter may be withdrawn or an extraneous cooling gas, lower boiling than $C_2$'s, can be withdrawn or introduced via line 33, respectively, as desired. A cooled extraneous cooling gas, lower boiling than $C_2$'s, can be introduced via line 34, if desired. I prefer that heat exchanger 13 be an indirect heat exchanger cooled by a coolant or refrigerant introduced via line 14 and withdrawn via line 32. The methane and lighter which has been cooled in heat exchanger 13 is passed into the cooling zone via line 35 wherein it contacts hot stripped selective adsorbent, thereby cooling the selective adsorbent. The selective adsorbent cooling zone is preferably operated at a pressure sufficiently below that of the adsorption, rectification and stripping zones so that it is not necessary to compress the cooling gas prior to its introduction into the cooling zone. I prefer to carry on adsorption, rectification and stripping at a pressure in the range from just above 0 to 480 pounds p. s. i. a. Resulting methane and lighter is withdrawn from the cooling zone via line 15 and is passed into a separating means wherein fine particles of the selective adsorbent are separated from the methane and lighter. Separating means 16 can conveniently be a cyclone separator, a Cottrell precipitator or a supersonic separator. Selective adsorbent particles separated from the methane and lighter are withdrawn from separation means 16 via line 36. Methane and lighter from which fine particles of the selective adsorbent has been removed is withdrawn from separation means 16 via line 17. A portion of this methane and lighter is withdrawn from the system as overhead gas via line 18, and a portion of the methane and lighter is passed via line 19 into blower 20 wherein the pressure is increased.

The pressured methane and lighter passes through line 21 and picks up hot stripped selective adsorbent from collecting chamber 9 and passes same via line 11 back into the selective adsorbent cooling zone. I prefer to use the gas-lift system described hereinabove to recirculate the selective adsorbent. However, other suitable means can be used, such as a bucket elevator or a screw conveyor means. The hot stripped selective adsorbent from 9 is partially cooled by gas passing through 21, and is also preferably partially cooled in indirect heat exchanger 22 during its passage back into the cooling zone. Selective adsorbent which has been cooled to a point suitable for its introduction into the adsorption zone, preferably to a temperature of from 85–120° F., is withdrawn from the cooling zone and passed into the adsorption zone by positive flow controller 23. Flow controller 23 can also be a flow controller means such as depicted in Figures 2 and 3. Flow controller 23 can be a positive controller which passes the solid selective adsorbent but prevents vapors from passing upward so as to flow from the adsorption zone into the selective adsorbent cooling zone. The feed gas, stripping gas, and the methane and lighter cooling gas are preferably introduced and the C₂ side product stream and the C₃ and C₄ bottom product stream is preferably withdrawn, by using inverted funnels as depicted in Figure 1. This type of gas distributor or vapor withdrawal means gives the minimum agitation of the charcoal and thus decreases attrition losses. However, other means of introducing vapors into and withdrawing vapors from the moving beds of selective adsorbent are satisfactory. Line 24 is provided for introducing extraneous gases such as methane to operate the gas-lift system. Line 25 is provided for withdrawing selective adsorbent which has been poisoned, for instance, by absorption oil, so that the selective adsorbent can be reactivated. Line 26 is provided for introducing reactivated adsorbent back into the system.

Figures 2 and 3 set forth a positive flow controller device which can be conveniently used as flow controllers 10 and 23 in adsorber 4 of Figure 1. The same reference characters are used on Figures 2 and 3 as on Figure 1 where possible. Figure 2 shows a vertical cross sectional view of the flow controller through the middle of adsorber 4 and the flow controller. The flow controller consists of 2 horizontal stationary plates 27 and 28 between which a cylindrical middle section 29 rotates. As depicted, the top plate 27 contains 4 holes evenly spaced about the outer portion of the plate. The bottom plate 28 also has 4 holes spaced evenly about the outer portion of the plate but set at an angle of 45° away from the holes in the top plate 27. The middle cylindrical rotating section has five holes spaced evenly about the outer portion of the section. The holes in the stationary plates and the cylindrical rotating section all have their centers equidistant from a common axis and are so spaced and of such size that selective adsorbent will pass down into the holes in the cylindrical rotating section through a hole in the top stationary plate at a time when the bottom of the hole in the cylindrical rotating section is sealed by the bottom stationary plate so that no vapors can pass from below the flow controller to a region above the flow controller. The rotating cylindrical section 29 then moves around to a point where the selective adsorbent will drop out of the hole in the cylindrical rotating section through a hole in the bottom stationary plate 28 while the top of the hole in the cylindrical rotating section is sealed by the top plate 27 so that no vapors can pass from below the flow controller to a region above the flow controller. In this manner solid selective adsorbent can be passed from a region higher in the adsorber to a region lower in the adsorber while preventing vapors from passing from a region below the flow controller, but at a higher pressure, to a region above the flow controller. I find that the number, size and position of the holes can be varied to accomplish the result desired as set forth herein. The general requirement for such a flow controller is that there never be a continuous gas flow path extending through a hole in the lower stationary plate, i. e., the outlet, through the hole in the middle rotating feeder section, and through the hole in the upper stationary plate, i. e., the inlet. This is accomplished by offsetting the outlets from the inlets. This offset must be at least equal to the length of the holes in the rotating section, or, stated conversely, the holes in the rotating section must not be longer, measured along the annulus arc, than the distance between the forward edge of an inlet hole and the initial edge of an outlet hole. All of said holes are located upon an annulus coaxially disposed in relation to said shell as stated above. The flow controller as depicted in Figures 2 and 3 is preferably operated by a drive shaft so that if the flow controller is used as flow controllers 10 and 23 in Figure 1, they may act in unison so as to maintain a constant and even flow of selective adsorbent through adsorber 4, that is, both flow controllers can be operated off the same drive shaft 31 which operates flow controllers 10 and 23 in Figure 1. The cylindrical rotating section 29 is rotated by gearing mechanism 30, the power being furnished by drive shaft 31. In operating the apparatus of my invention I prefer that both flow controllers deliver the same amount of selective adsorbent so that problems of build-up are at a minimum.

Following is an example of a process of my invention. The pressures, temperatures, quantities, flow rates, etc., set forth in the following example are not to be deemed to unduly limit the scope of my invention. The material balance table which accompanies this example is a part of this example and sets forth the flow rate and composition of the feed gas treated, the overhead gas produced, the rectified side-cut produced, and the bottoms make gas produced.

*Material balance*

| Comp. | Feed Gas | | Overhead Gas | | Rect. Sidecut Make | | Bottoms Make Gas | |
|---|---|---|---|---|---|---|---|---|
| | Mol/Hr. | Mol. Percent | Mol/Hr. | Mol. Percent | Mol/Hr. | Mol. Percent | Mol/Hr. | Mol. Percent |
| $H_2$ | 54.0 | 8.90 | 54.0 | 15.9 | | | | |
| $N_2$ | 34.0 | 5.60 | 34.0 | 10.0 | | | | |
| $CO$ | 11.0 | 1.81 | 11.0 | 3.2 | | | | |
| $C_1$ | 227.0 | 37.40 | 226.8 | 66.7 | 0.2 | 0.1 | | |
| $CO_2$ | 21.3 | 3.51 | 13.9 | 4.1 | 7.4 | 4.3 | | |
| $C_2=$ | 62.5 | 10.30 | 0.3 | 0.1 | 62.2 | 35.9 | | |
| $C_2$ | 96.9 | 15.96 | | | 96.8 | 55.9 | 0.1 | 0.1 |
| $H_2S$ | 19.1 | 3.15 | | | 6.4 | 3.7 | 12.7 | 13.6 |
| $C_3=$ | 63.3 | 10.42 | | | 0.2 | 0.1 | 63.1 | 67.3 |
| $C_3$ | 17.3 | 2.85 | | | | | 17.3 | 18.4 |
| $C_4+$ | 0.6 | 0.10 | | | | | 0.6 | 0.6 |
| Total | 607.0 | 100.00 | 340.0 | 100.0 | 173.2 | 100.0 | 93.8 | 100.0 |

Separation of the feed gas is carried out in the apparatus and by the method as set forth in diagrammatic flow sheet, Figure 1. The feed gas passed into adsorber 4 via line 5 is at a temperature of 101° F. and at a pressure of 90 p. s. i. a., the pressure at which adsorption, rectification and stripping are carried out in adsorber 4. Activated coconut shell charcoal is used as the selective adsorbent and has a particle size of from 20 to 60 mesh. The activated charcoal is circulated through adsorber 4 at a rate of 80,000 pounds per hour. The temperature of the activated-charcoal just below flow controller 23 at the point of withdrawing the gas from the moving bed to be used as cooling gas is 130° F. The temperature of the charcoal at the point where the rectified side-cut is withdrawn is 218° F. The temperature of the charcoal at the point of withdrawing the bottoms make gas is 402° F. The temperature of the stripped charcoal withdrawn from the stripping zone by flow controller 10 is 554° F. The temperature of the charcoal at the point where feed gas is introduced into the bed is 151° F. Superheated steam at a temperature of 600° F. and at a pressure of 150 p. s. i. a. is introduced via line 8 into the lower portion of the stripping zone at a rate of 2980 pounds per hour. A portion of the overhead gas is used to pass the stripped charcoal from cooling chamber 9 back into the activated-charcoal cooling zone at the top of adsorber 4. The activated-charcoal cooling zone is operated at a pressure slightly below 90 p. s. i. a. so that it is not necessary to use a blower to introduce the cooling gas into the activated-charcoal cooling zone via line 35. Cooling water is used to partially cool the hot stripped activated-charcoal in indirect heat exchanger 22 during its passage in admixture with lift-gas from collecting chamber 9 back into the activated-charcoal cooling zone.

As will be evident to those skilled in the art, various modifications of this invention can be made, or followed, in the light of this disclosure and discussion, without departing from the spirit or scope of this disclosure or from the scope of the claims.

I claim:

1. Selective adsorption separation apparatus which comprises, in combination, a cylindrical closed elongated vessel which is vertically disposed, a first flow controller in the upper portion of said vessel, a second flow controller in the lower portion of said vessel, each of said flow controllers comprising, in combination, upper and lower stationary horizontal cylindrical plates contiguous a middle horizontal cylindrical rotatable section, said upper stationary plate having four holes therethrough, said lower stationary plate having four holes therethrough and said middle rotatable section having five holes therethrough, all of said holes being circular in cross section, having the same cross sectional area and having their centers equidistant from a common center axis, said holes being located in the outer portion of said stationary plates and said rotatable section and the center axis of each of said holes in each of said stationary plates and said rotatable section being equidistant from the center axis of adjacent holes, said holes in said upper stationary plate being located 45° away from said holes in said lower stationary plate, each of said flow controllers permitting downward movement of solid particles but preventing upward movement of vapors, a conduit externally communicating between a region of said vessel below said first flow controller and a region of said vessel above said first flow controller, said conduit being provided with indirect heat transfer means, a feed gas inlet conduit below said first flow controller, at least one product outlet below said feed gas inlet conduit, a stripping gas inlet conduit below said lower most product outlet conduit, means for transferring solid material from a region of said vessel below said second flow controller to a region of said vessel above said first flow controller, and a conduit communicating between a region of said vessel above said first flow controller and a region outside said vessel.

2. Selective adsorption separation apparatus which comprises in combination an upright, elongated vessel, closed at its upper and lower ends; an adsorbent inlet in the upper end portion of said vessel; an adsorbent outlet in the lower end portion of said vessel; lift means extending between said adsorbent outlet and said adsorbent inlet; a cooler in indirect heat exchange with said lift means; a first adsorbent flow controller transversely disposed within the upper portion of said vessel and below said adsorbent inlet, whereby said vessel is sealed so as to prevent gas flow from the section below said controller to the section above said controller, said flow controller comprising a rotatable feeder member positioned within said vessel, said feeder being provided with a plurality of equal size holes therethrough arranged symmetrically around the axis of said rotatable feeder; a first stationary horizontal plate affixed at its periphery to the wall of said vessel by a gas-tight seal and closely fitted with the upper surface of said rotatable feeder, said plate being provided with a plurality of equal size inlets therethrough spaced a distance from the axis of said rotatable feeder equal to the distance from said axis to the holes in said feeder; a second stationary horizontal plate affixed at its periphery to the wall of said vessel by the gas-tight seal and closely fitted with the lower surface of said rotatable member, said plate being provided with a plurality of equal size outlets therethrough equally spaced from the axis of said rotatable feeder and spaced a distance from the axis of said rotatable feeder equal to the distance of said holes in said rotatable feeder from said axis and laterally offset from said inlets in said first stationary plate by at least the length of a hole in said rotatable feeder; a second said flow controller in the lower portion of said vessel; rotation means operatively connected to both of said rotatable middle members; a feed gas conduit below said first flow controller; at least one product outlet conduit below said feed gas inlet conduit; a stripping gas inlet conduit below the lowermost product outlet conduit; a product outlet conduit extending from said vessel at a point between said feed gas inlet conduit and said first flow controller and extending into said vessel above said first flow controller; a cooler in indirect heat exchange with said product outlet conduit outside of said vessel; and a conduit extending from a point in said vessel above said adsorbent inlet and a region outside said vessel.

FORREST E. GILMORE.

References Cited in the file of this patent

UNITED STATES PATENTS

| Number | Name | Date |
| --- | --- | --- |
| 102,745 | Young | May 3, 1870 |
| 1,825,707 | Wagner, Jr. | Oct. 6, 1931 |
| 2,349,098 | Kiesskalt et al. | May 16, 1944 |
| 2,354,383 | Kiesskalt | July 25, 1944 |
| 2,379,195 | Simpson et al. | June 26, 1945 |
| 2,527,964 | Robinson | Oct. 31, 1950 |
| 2,544,214 | Berg | Mar. 6, 1951 |

FOREIGN PATENTS

| Number | Country | Date |
| --- | --- | --- |
| 317,629 | Great Britain | Aug. 22, 1929 |
| 721,907 | France | Mar. 9, 1932 |

OTHER REFERENCES

Publication, "Hypersorption Process For Separation of Light Gases," Clyde Berg, A. I. Ch. E. Transactions, August 1946, pages 665–680.